United States Patent Office 2,838,205
Patented June 10, 1958

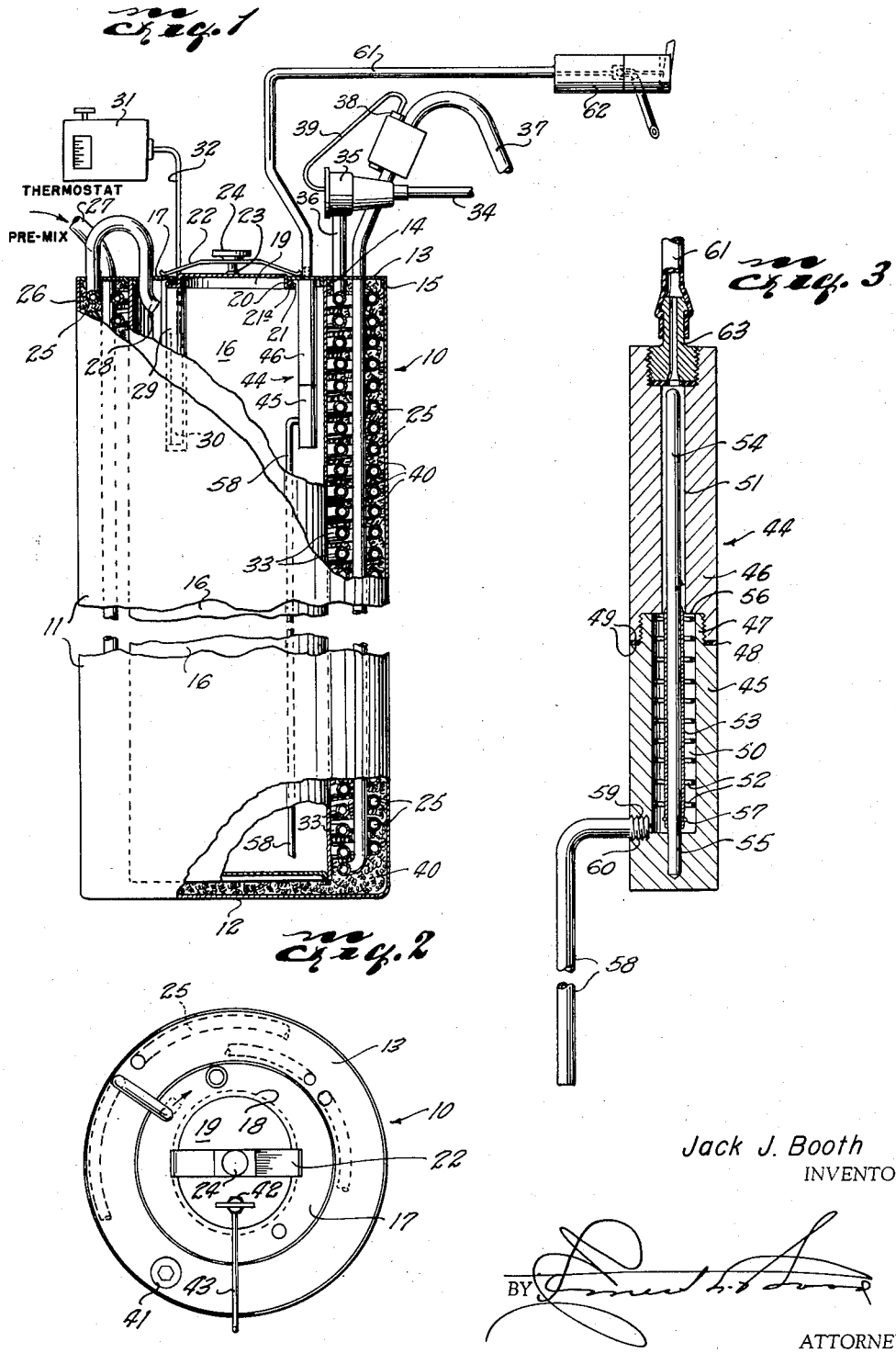

2,838,205

FLOW CONTROL VALVE

Jack J. Booth, Dallas, Tex.

Application December 15, 1954, Serial No. 475,394

6 Claims. (Cl. 222—52)

This invention relates to the vending of precarbonated beverages in cups and it has particular reference to new and useful improvements in means for controlling the behavior of the carbonated water in its course from refrigerated storage to a point of discharge.

The invention pertains to that type of equipment wherein coin operated cup vending machines are placed at strategic locations for public use and replenished from pre-carbonated beverage drums transported by trucks or otherwise from a beverage plant to the vending machine where one or more drums are connected to a heat exchanger within the machine which is kept at controlled temperatures so that the beverage, when drawn therefrom into a waiting cup, will not foam and will be maintained at a predetermined temperature irrespective of the rate of draw.

In order to overcome the major problem in the vending of pre-carbonated beverages, that of maintaining uniform temperature thereof to obviate foaming, a heat exchanger has been devised, employing eutectic solution consisting of polyethylene glycol for its heat transferring qualities combined with aluminum chips or shavings to accelerate the characteristically slow heat transference of this type of eutectic solution. This composition is included in the subject matter of my co-pending application filed December 15, 1954, Serial Number 475,393. However, added to the problem of maintaining uniformity of temperatures is the problem of regulating the pressure drop of expandable fluid which passes from the heat exchanger to the delivery valve.

It is, therefore, the principal object of the present invention to provide a volume control valve for precarbonated beverages.

Another object of the invention is to provide a volume control valve which is fully automatic and, since it functions under predetermined spring setting according to liquid volume requirements, it is unnecessary that the valve be manually manipulated in any manner which makes it possible for the valve to be incorporated in the discharge line of a pre-mix chamber of a heat exchanger to eliminate temperature rise of the liquid due to holdover in the flow control valve.

Still another object of the invention is to provide a flow control valve situated in the heat exchanger, consisting of a tubular body in axially aligned sections through which the carbonated water passes and in which the bores of the sections are of different diameters, the largest bore containing an elongate sleeve adapted to be propelled into the smaller bore of the companion section under increasing fluid pressure and against the resistance of a coil spring in said largest bore, the action being effective to elongate the orifice defined by the sleeve and smaller bore and as the orifice length increases, pressure drop of fluid is correspondingly increased, thus maintaining a constant volume flow of liquid at the discharge valve.

With the foregoing and other objects in view, the invention has particular reference to certain salient features of construction described herein and shown in the annexed drawing, wherein:

Figure 1 is a side elevational view of a heat exchanger with parts broken away to show an inner storage tank and to reveal the flow control valve of the invention installed in the tank.

Figure 2 is a top plan view of the heat exchanger, and

Figure 3 is a detail view of the flow control valve per se in longitudinal cross-section.

Continuing with a more detailed description of the drawing, reference is primarily made to Figures 1 and 2 which show details of a heat exchanger generally indicated by reference numeral 10 and which represents one adaptation of the invention, it being understood that the flow valve constituting the present invention may find many uses other than herein prescribed.

The heat exchanger 10 consists of an outer tank 11 having a bottom 12 and an annulus 13 having inner and outer downwardly turned annular flanges 14 and 15, respectively, the latter being welded to the top edge of the tank 11 while the flange 14 is welded to the top edge of an inner tank 16, concentric with the tank 11 and which constitutes a storage tank for pre-mixed liquid when the supply is exhausted from the pre-mix drums, not shown, which are disposed in the vending machine cabinet along with a conventional refrigerating machine and its compressor.

The storage tank 16 has a cover flange 17 which is welded about its outer periphery to the inner top edge of the storage tank 17 opposite the inner flange 14 of the annulus 13. An ellipsoidal opening 18 is formed in the top or cover 17 and is closed by a closure 19 of like shape which has a depending flange 20 which is turned outwardly and upwardly to form a lip 21 (Figure 1) which retains an O-ring 21a in the annular cavity produced by the flange 20 and lip 21 about the perimeter of the said flange 20. The O-ring 21a is brought upwardly into compressive engagement with the cover flange 17 by means of a bar 22 which bridges the short axis of the elliptical closure 19 and rests at its ends on opposite sides of the cover 17. A threaded stud 23 is affixed to the center of the closure 19 and extends upwardly through a hole in the midsection of the bar 22 and receives a nut 24 by which downward pressure is applied to the bar 22 at its midsection to exert downward force on the cover 17 through the ends of the bar resting thereon and to exert an upward force on the closure through the stud 23, thus to secure firm contact of the O-ring 21a with the undersurface of the cover flange 17.

To further describe the heat exchanger 10, an outer coil of stainless steel tubing 25 is arranged in the tank 11 in the annular space 26 between the walls of the tanks 11 and 16. Beverage from a storage drum, not shown, is forced into the coil 25 through inlet 27 by $CO_2$ gas pressure introduced into the syrup drum under control of a conventional $CO_2$ regulator, not shown. After circulating through the coil 25 the pre-mix enters the inner tank 16 through the inwardly curved end 28 of the coil 25 which deflects the pre-mix against a thermostat bulb well 29 containing the bulb 30 which is connected to a thermostat 31 by the element 32. By deflecting the liquid against the bulb well, quicker reflection of temperature is obtained, thus controlling the starting and stopping of the compressor of the refrigerating machine with minimum differential.

An inner coil 33 is arranged in the annular space 26 next adjacent the inner tank 16. A suitable refrigerating fluid, such as Freon, is introduced into this coil through the inlet pipe 34, an expansion valve 35 and a tube 36. After passing through the coil 33, the refrigerant emerges through a tube 37 for recirculation through the refrigerating apparatus. A bulb 38 held in intimate contact with the refrigerant outlet pipe 37 has connection through the element 39 with the expansion valve 35 to control the same.

As set forth in my co-pending application filed December 15, 1954, Serial Number 475,393, the space 26 between the two tanks 11 and 16 is filled with eutectic solution, preferably polyethylene glycol and aluminum shavings 40 speed conduction. The coils 25 and 33 for the pre-mix and refrigerant, respectively, are immersed in the solution at all times. The eutectic solution described, with water in predetermined proportion, goes through heat of fusion at temperatures above 32° F. The aluminum particles in intimate contact with the voids filled with the solution results in high capacity eutectic storage as well as providing rapid conduction in cooling and in giving up temperature, as the product may require. A filler opening to the space 26, closed by a plug 41 is provided for the introduction of the solution and metallic cuttings 40.

The tank 16 is provided with a $CO_2$ gas bleed-off valve 42 and overflow tube 43, as recited in my co-pending application above identified.

Referring now to the particular subject matter of the present invention, the flow control valve is shown in enlarged detail in Figure 3 and identified generally by reference numeral 44. This valve is made up of two body sections 45 and 46, the section 45 having a threaded nipple 47 which engages the internal threads in the adjacent end of the section 46 of the valve body. A compressible washer 48 is interposed between the confronting shoulders 49 of the two sections.

The section 45 of the valve body has an axial bore 50 which terminates short of the free end of the section and this bore is in longitudinal alignment with a bore 51 of the companion section 46. However, the bore 50 is a larger diameter than the bore 51 of the section 46 and contains a coil spring 52. The coil spring 52 embraces an elongate sleeve 53 which is substantially coextensive with the bore 50 of the body section 45 and is slidable longitudinally on a guide rod 54 which has one end 55 anchored in the free end of the body sections 45, the remaining length of the guide rod being floatingly suspended concentrically within the two bores 50 and 51, and extending entirely through both bores.

The coil spring 52 bears at one end against an internal annular shoulder 56 in the body section 46 and has its opposite end affixed at 57 to the sleeve 53 at the end thereof opposite the shoulder 56. In this manner the spring 52 resists any effort of the sleeve 53 to move on the guide rod 54 in the direction of the annular orifice created between the guide rod and the walls of the smaller bore 51 of the body section 46.

It will be observed that a pick-up tube 58 has one end 59 threadedly entering an opening 60 near the closed end of the body section 45 and communicates with the bore or chamber 50 therein. The pick-up tube depends within the inner tank 16 of the heat exchanger as revealed in Figure 1 and terminates short of the bottom of the tank 16. Pre-carbonated beverage is forced by $CO_2$ gas pressure upwardly through the tube 58 and into the chamber 50 of the flow control valve.

The sliding sleeve 53 functions as a piston and, as pressure of the expandable fluid increases in the tank 16, this pressure in like volume enters the chamber 50 of the valve, forcing the sleeve 53 further into the bore or chamber 51 of the body section 46 against the resistance of the spring 52 with the obvious result that the effective length of the annular orifice defined by the sleeve and the walls of the chamber 51 is increased. As the orifice length increases there is a corresponding drop in fluid pressure within the chamber 51 and in the tube 61 which leads to a discharge valve 62, such as described in my co-pending application filed July 23, 1956, Serial Number 599,509. It is clearly apparent therefore that a constant volume flow of beverage at the discharge valve 62 prevails at all times irrespective of the pressure differentials in the tank 16.

The section 46 of the flow valve body 44 is interiorly threaded at the discharge end of the chamber 51 to receive a nipple 63 to which the discharge tube 61 is connected at one end, the opposite end thereof being connected to the delivery valve 62.

The sleeve 53 is at all times disposed partly in the chamber 50 and partly in the bore 51, and is slidable on the rod 54. There is a small annular space surrounding the sleeve 53, within the bore 51, which forms a passage of restricted cross sectional area through which fluid entering the chamber 50 through the line 58 must flow. The distance which the sleeve 53 penetrates the bore 51 varies directly with the pressure obtaining in the chamber 50. Such distance determines the length of the passage of restricted cross sectional area, comprising the annular space between the sleeve 53 and the bore 51, through which the fluid must flow, and thus reduces the rate of flow.

The sleeve 53 is movable longitudinally on the rod 54, against the resistance of the spring 52, by the action of fluid flowing through the device. Fluid entering the chamber 50 is capable of acting on the end of the sleeve 53 nearest the line 58, and also frictionally engages the peripheral surface of the sleeve 53 throughout its length.

Manifestly, the construction as shown and described is capable of some modification and such modification as may be construed to fall within the scope and meaning of the appended claims is also considered to be within the spirit and intent of the invention.

What is claimed is:

1. In a heat exchanger for pre-carbonated beverages having a beverage cooling tank and pick-up tube provided with a delivery valve, a flow control device in the cooling tank between the pick-up tube and the delivery valve comprising an elongated body in separable, longitudinally aligned tubular sections, one of the sections having a bore of greater diameter than the bore of the companion section and axially aligned therewith, a guide rod anchored at one end in said one of the sections and extending concentrically through the bores of both of the sections, a sleeve substantially coextensive with the larger of the bores and spring biased away from the other of the bores and means for admitting beverage into the larger bore from the pick-up tube to displace the sleeve on the guide rod into the smaller bore to vary the effective length of the annular orifice defined between the exterior surface of the sleeve and the wall of the smaller bore in direct proportion to the differential of the pressures in the bores.

2. A pressure compensating volume flow control device comprising, in combination with a pre-carbonated beverage cooler having a beverage cooling tank, a pick-up tube and a delivery valve, an elongated body in the cooling tank between the pick-up tube and the delivery valve having a first axial chamber provided with a beverage inlet in communication with the pick-up tube and a second axial chamber in longitudinal alignment with the first axial chamber, the second axial chamber being smaller in diameter than the first chamber and in communication with the delivery valve, a guide rod extending axially through both of the chambers, an elongated sleeve slidable longitudinally on the rod and spring biased toward the beverage inlet and adapted to be moved under pressure of beverage entering the first chamber through the inlet into the second chamber to increase the effective length of an annular orifice between the exterior surface of the sleeve and the wall of the second chamber to correspondingly increase the pressure drop in the second chamber and to produce a constant volume flow of beverage at the delivery valve.

3. In a device for controlling pressure variations between a pre-carbonated beverage cooler tank and a beverage delivery valve, an elongated body in the tank incorporated in a beverage tube connecting the cooler tank and the delivery valve, the body having a large axial chamber having a beverage inlet to which the beverage tube is connected and a small axial chamber in communication at the mid-section of the body, a sleeve concentric with the large chamber and movable longitudinally into the small chamber under pressure of beverage entering the inlet to define a concentric orifice between the exterior surface of the sleeve and the wall of the small chamber, the degree of longitudinal displacement of the sleeve in the small chamber being effective to correspondingly change the ratio of the pressures in the chambers and to maintain a constant volume flow of beverage at the delivery valve.

4. The structure of claim 3, and means anchored at one end in one end of the large chamber and extending axially through the large and small chambers for slidably supporting the sleeve.

5. The structure of claim 3, and a coil spring embracing the sleeve for normally biasing it away from the small chamber.

6. A flow control device comprising an elongated body in separable, longitudinally aligned tubular sections, one of the sections having a bore of greater diameter than the bore of the companion section and axially aligned therewith, a guide rod anchored at one end in said one of the sections and extending concentrically through the bores of both of the sections, a sleeve slidable on the guide rod and substantially coextensive with the larger of the bores and yieldably biased away from the other of the bores and means for admitting fluid into the larger bore to displace the sleeve on the guide rod into the smaller bore to vary the effective length of the annular orifice defined between the exterior surface of the sleeve and the wall of the smaller bore in direct proportion to the differential of the pressures in the bores.

References Cited in the file of this patent

UNITED STATES PATENTS

| | | |
|---|---|---|
| 1,481,792 | Dailey | June 29, 1924 |
| 1,944,088 | Linderoth | Jan. 16, 1934 |
| 2,331,729 | Rice | Oct. 12, 1943 |
| 2,441,220 | Dixon | May 11, 1948 |
| 2,508,492 | Chace | May 23, 1950 |
| 2,584,418 | Branson | Feb. 5, 1952 |

FOREIGN PATENTS

| | | |
|---|---|---|
| 595,243 | Germany | Apr. 5, 1934 |